United States Patent [19]

Ueeda et al.

[11] Patent Number: 4,604,441
[45] Date of Patent: Aug. 5, 1986

[54] POLYPROPYLENE SHEET

[75] Inventors: Ryuhei Ueeda, Kurashiki; Kiyonobu Fujii, Okayama; Hiroshi Narukawa, Soja, all of Japan

[73] Assignee: Kuraray Company, Ltd., Kurashiki, Japan

[21] Appl. No.: 713,829

[22] Filed: Mar. 20, 1985

[30] Foreign Application Priority Data

Mar. 29, 1984 [JP] Japan .................................. 59-62447

[51] Int. Cl.$^4$ .............................................. C08F 10/06
[52] U.S. Cl. .................................................... 526/351
[58] Field of Search ......................................... 526/351

[56] References Cited

U.S. PATENT DOCUMENTS

| 4,113,935 | 9/1978 | Schippers | 526/351 |
| 4,405,775 | 9/1983 | Hashimoto | 526/351 |
| 4,500,682 | 2/1985 | Chiba | 526/351 |

Primary Examiner—Paul R. Michl
Attorney, Agent, or Firm—Oblon, Fisher, Spivak, McClelland & Maier

[57] ABSTRACT

Polypropylene sheets of high impact resistance at low temperature and of improved formability characterized by specific parameters are described. Such polypropylene sheets are produced by spreading under pressure polypropylene sheets at a temperature within a very narrow range in the vicinity of the melting point of the propylene-based polymer.

19 Claims, 3 Drawing Figures

POLYPROPYLENE SHEET

BACKGROUND OF THE INVENTION

This invention relates to a polypropylene sheet having markedly improved impact strength, in particular high impact resistance at low temperatures, free of anisotropy and having good formability.

Polypropylene sheets are used widely and mainly in the manufacture of a variety of containers, automobile parts, parts of electric devices and appliances, packaging materials, and so forth, either with or without processing such as vacuum forming, pressure forming or press forming. However, polypropylene is unfavorably very poor in impact resistance, in particular impact resistance at low temperatures, and therefore the field of use thereof is limited. Various proposals have already been made to alleviate this difficulty. For instance, there are proposals for improvement in impact resistance according to which polypropylene should be blended with some other resins or plasticizers or polypropylene should be copolymerized with some other monomers. In particular, ethylene-propylene block copolymers are in wide use as propylene-based resins having improved low-temperature impact resistance. However, such chemical modification methods cannot yet produce sufficient improvement in impact strength but rather present difficulties such as decrease in tensile strength, flexural strength and/or elastic modulus. These chemical modification methods further have a drawback in that the modifiers used may easily cause reduction in thermoforming characteristics, processability, electric characteristics, water resistance, solvent resistance, chemical resistance, weatherability and other performance characteristics.

Other methods proposed comprise modification of polypropylene sheet manufacturing conditions or secondary processing of polypropylene sheets obtained. For instance, it is known to uniaxially or biaxially stretch a polypropylene sheet. It is also known to uniaxially or biaxially roll a polypropylene sheet at a temperature lower than the melting point thereof, preferably at a temperature below 140° C. (U.S. Pat. No. 3,714,320). It is further known to extrude a polypropylene sheet in the solid state at a temperature below the crystalline melting point thereof (U.S. Pat. No. 4,282,277). In addition, it is known that solid-phase pressure forming can give a biaxially oriented shaped article or sheet. These methods proposed indeed produce impact resistance-increasing effect to a greater extent as compared with the methods mentioned hereinabove, but the effect is still unsatisfactory. Moreover, the thus-obtained sheets disadvantageously have poor formability and/or shape or dimensional stability, which results from marked orientation of the resin in the crystal region, amorphous region and/or paracrystalline region in the sheet obtained; for instance, when the sheet is preheated for vacuum forming or pressure forming, the tension resulting from said heating may lead to breakage of the sheet or, when stored for a long period, the molded article tends to return to its original shape before molding.

SUMMARY OF THE INVENTION

It is an object of the invention to provide a polypropylene sheet having improved impact resistance and good formability and capable of giving shaped articles having good dimensional stability, while retaining intrinsic properties of such sheet.

As a result of their intensive studies to overcome the above disadvantages, the present inventors found that when a sheet is produced under specific conditions to be mentioned hereinbelow using a propylene-based polymer having a melt flow rate of not more than 5 and propylene unit content of not less than 70% by weight, the sheet obtained is markedly improved in impact resistance, particularly in impact resistance at low temperatures, with other physical properties retained or rather improved. Furthermore, as a result of studies on sheet characteristics, it was found that such sheet showing markedly increased impact resistance and giving shaped articles with good stability has the characteristic values mentioned below which define the structure of the crystal region and amorphous region of the resin within the sheet, and the present inventors have now completed the present invention.

Thus, the invention provides:

(1) A polypropylene sheet characterized in (a) that the base material is a propylene-based polymer having a melt flow rate of not more than 5 and a propylene unit content of not less than 70% by weight, (b) that the maximum value (Ftmax) among the values (Ft's) of integration of the force parallel to the sheet plane as appearing upon heating said sheet at a temperature above the melting point thereof over the time period during which said force is observed falls within the range of 0.5–45 kg·minute/cm$^2$, (c) that the ratio (RFt) between Ft's measured in directions at right angles to each other on the sheet plane is not more than 10, and (d) that the melting point (Tms) of said sheet is higher than the melting point (Tmr) of said sheet as measured after melting followed by recrystallization thereof in the unstrained condition, the melting point difference ($\Delta$Tms = Tms − Tmr) being at least 3° C.;

(2) A sheet as set forth above, wherein the propylene-based polymer constituting said sheet has a crystallinity of at least 65% and wherein the orientation function (fc) is not more than 0.4;

(3) A sheet as set forth above, wherein the average notched izod impact strength of said sheet at 0° C. is at least 50 kg·cm/cm;

(4) A sheet as set forth above, wherein the average notched izod impact strength of said sheet at −30° C. is at least 30 kg·cm/cm;

(5) A sheet as set forth above, wherein the dimensional change in sheet thickness as measured at 120° C. is not more than 5%; and (6) A sheet as set forth above, wherein the ratio (RIzo) between notched izod impact strength values measured at 0° C. in directions at right angles to each other on the sheet plane is not more than 3.

The characteristics mentioned above are measured by the following methods:

(a) Melt flow rate (hereinafter sometimes referred to by the abbreviation MFR)

The method prescribed in ASTM D 1238 is used, and the MFR is expressed in terms of g/10 minutes.

(b) Melting point (Tm)

Using a differential scanning calorimeter, 5–15 mg of resin sample is heated under nitrogen at a constant heating rate of 10° C. per minute. The melting point is the temperature corresponding to the apex of the endothermic peak due to melting of resin crystals (if a plurality of peaks are observed, the apex of that peak which shows maximum endothermism).

(c) Integral, on time interval, of force parallel to sheet plane as appearing upon heating (Ft)

Test pieces, 10 mm in width, 90 mm in length and the same as the sheet in thickness, are cut from the sheet to be tested. Using a tensile tester (Instron universal tester) provided with a constant-temperature bath maintained at 185° C. therewithin, each test piece is inserted therein with the distance between grips adjusted to 30 mm, and the force of lengthwise shrinkage of the test piece as caused by heat is measured without moving the mobile crosshead for the period during which said force is observed. On a chart placed on the Instron universal tester, there is recorded the force of lengthwise shrinkage in the form of a peak (on the ordinate) against the time (on the abscissa). Then the peak area is calculated as follows. The peak area=(the height of the peak) x (the half-width of the peak) And the Ft value is defined by the following equation. Ft=(peak area)/(the cross-sectional area of the test piece) The number of test pieces should be at least 3 and the mean value is taken as Ft.

(d) Maximum Ft (Ftmax)

Ft values are determined in various directions on the sheet plane. Ftmax is the maximum among them.

(3) Ratio between Ft's (RFt)

The Ft value measured in a direction on the sheet plane at a right angle to the direction in which the above Ftmax is obtained is referred to as Ftmin. RFt is given by the following formula:

$$RFt = \frac{Ftmax}{Ftmin}$$

(f) Melting point difference (ΔTms)

$$\Delta Tms = Tms - Tmr$$

(f-1) Tms (Melting point of sheet)

The melting point of the sheet is the value as measured in accordance with the above-mentioned method of Tm measurement.

(f-2) Tmr (Melting point of sheet after recrystallization)

A test sheet is heated to a temperature above 190° C. to thereby cause complete melting of crystals. The molten sheet is then cooled thoroughly from both sides using water-cooled cooling plates. After allowing the cooled sheet at room temperature for at least 48 hours to thereby induce recrystallization to the fullest extent, the recrystallized sheet is tested for the melting point by the above-mentioned method of measuring Tm. The melting point thus obtained is Tmr.

(g) Crystallinity

The crystallinity is measured by the conventional X-ray diffraction method.

(h) Degree of crystalline c-axis orientation (orientation function; fc)

The value fc is calculated, by the method of Stein, from the value obtained by X-ray diffraction method with the direction of incident X-ray perpendicular to the sheet plane. Thus, it is calculated from the distribution functions, I(φ) for the (110) and (040) planes of monoclinic polypropylene in accordance with the following equations:

$$<\cos^2\phi_{110}> = \frac{\int_0^\pi I(\phi)\cos^2\phi\sin\phi d\phi}{\int_0^\pi I(\phi)\sin\phi d\phi}$$

$$<\cos^2\phi_{040}> = \frac{\int_0^\pi I(\phi)\cos^2\phi\sin\phi d\phi}{\int_0^\pi I(\phi)\sin\phi d\phi}$$

$$fc = \frac{1}{2}\{3(1 - 1.099<\cos^2\phi_{110}> - 0.901<\cos^2\phi_{040}>) - 1\}$$

wherein φ is the azimuth angle and the I(φ) is the distribution function.

(i) Notched izod impact strength (Iz)

The method prescribed in ASTM D 256 is used.

(j) Average notched izod impact strength (Īz)

Notched izod strength measurement is performed in various directions on the sheet plane. The average notched izod impact strength (Īz) is defined as the mean between the maximum (Izmax) among the values obtained and the notched izod impact strength value (Izmin) obtained for the direction perpendicular to the direction in which said Izmax is obtained.

(k) Izod impact strength ratio (RIz)

This ratio is calculated from the Izmax and Izmin values measured in the above manner in accordance with the following formula:

$$RIz = \frac{Izmax}{Izmin}$$

(l) Dimensional change in sheet thickness

The sheet is measured for thickness on at least 4 measurement sites chosen such that said sites are located in a balanced manner throughout the sheet. Then, the sheet is heated at 120° C. for 1 hour, allowed to cool to room temperature, further allowed to stand for at least 24 hours, and measured for thickness on the same measurement sites as before. The dimensional change in sheet thickness is calculated as follows:

Dimensional change in thickness (%) =

$$\frac{\text{Thickness after heating} - \text{Thickness before heating}}{\text{Thickness before heating}} \times 100$$

DETAILED DESCRIPTION OF THE PREFERRED EMBODIMENTS OF THE INVENTION

In the accompanying drawings;

FIG. 1 is a SEM photograph showing the fracture surface of a sheet according to the invention. FIG. 2 and FIG. 3 are SEM photographs showing the fracture surfaces of conventional sheets.

Figure 1:
FIG. 1, FIG. 2 and FIG. 3 are scanning electron microscope (SEM) photographs showing the fracture surfaces of sheets tested by ASTM D 256 (Notched Izod Impact Strength Test).

The propylene-based polymer to be used in the practice of the invention is a polymer in which propylene units account for not less than 70% by weight, preferably not less than 85% by weight, of its constituent units. It can include propylene homopolymer, random or block copolymers of propylene and ethylene or other olefin, propylene-maleic anhydride and propylene-acrylic acid copolymers. Particularly preferred are propylene homopolymer and ethylene-propylene block copolymers.

When the propylene content in the polymer is below 70% by weight, there is no more found the correlation between the characteristics presumably due to the crystalline structure of polypropylene as attainable according to the invention and the physical properties of the sheet such as low-temperature impact resistance and formability.

It is important that the melt flow rate of said polymer is not more than 5. For the polymer to be given markedly improved low-temperature impact resistance in accordance with the invention said polymer is required to have a sufficiently high molecular weight. The melt flow rate serves as an adequate measure for the molecular weight. When a polymer of a melt flow rate exceeding the above range is used, it is impossible to attain the favorable crystalline and amorphous (or noncrystalline) state of polypropylene molecules as mentioned later; even when the same production method as mentioned later is employed, it is impossible to provide the sheet with sufficiently increased impact resistance.

A first characteristic feature of the sheet according to the invention lies in that the maximum value (Ftmax) among the values (Ft's) of integration of the force parallel to the sheet plane as appearing upon heating at a temperature not lower than the melting point thereof over the time period during which said force is observed falls within the range of 0.5-45 kg·minute/cm$^2$. Said Ft value is a physical parameter indicative of the state of the amorphous region in the polypropylene molecule. A small Ft value indicates that molecules are oriented only to a small extent in the amorphous region. Namely, the molecular structure of the amorphous region is supposed to be such that the impact energy can easily be absorbed by the structure. Intrinsically, it is considered that when this value is small (namely, the molecular orientation is of a small extent), the impact resistance would be great. In reality, however, there exists a lowest limit value below which the impact strength decreases. The reasons therefor are not clarified. Conventional extrusion-molded sheets for which said value is substantially equal to zero are poor in impact strength. Similarly, there is an upper limit to said Ftmax. In the so-called cold rolling or calendering where the rolling temperature is not higher than the softening point of polymers (140° C. for propylene homopolymer), an increase in thickness reduction easily result in the formation of sheets showing a Ftmax value exceeding 45 kg·minute/cm$^2$. These sheets cannot satisfactorily increase the impact resistance. It has been found by the present inventors that said Ftmax value should preferably be in the range of 0.5-35 kg·minute/cm$^2$, more preferably 1-20 kg·minute/cm$^2$, most preferably 1-15 kg·minute/cm$^2$.

A second characteristic feature of the sheet according to the invention lies in the melting point thereof. The sheet according to the invention, when compared with the same sheet after melting and recrystallization, exhibits a melting point difference ($\Delta$Tms) of at least 3° C. With a sheet having satisfactory performance characteristics, said melting point difference amounts to not less than 5° C., preferably not less than 8° C. Thus, it is a characteristic feature of the sheet according to the invention that when the sheet is melted and allowed to recrystallize, its melting point lowers.

A further characteristic feature of the sheet according to the invention lies in that the sheet is anisotropic only to a small extent, as indicated by the value RFt. Sheets showing a large RFt value are obtainable by the conventional method of rolling or calendering. The rolled sheets have sufficient impact strength in a certain specific direction but their performance characteristics measured in the direction perpendicular to said direction are in general very unsatisfactory and moreover they show extremely low strength against a force perpendicular to the sheet plane in the falling ball impact test prescribed in JIS K 7211 or in the penetration resistance test prescribed in JIS T 8131. The anisotropy of such sheet can easily be confirmed on the basis of the ratio RIz in notched izod impact strength mentioned hereinabove.

In accordance with the invention, there can be obtained sheets markedly improved in low-temperature impact strength, for instance sheets having an average notched izod impact strength at 0° C. ($\bar{I}z_0$) of not less than 50 kg·cm/cm and in particular an average notched izod impact strength at $-30°$ C. ($\bar{I}z_{-30}$) of 30 kg·cm/cm, by selecting specific materials and setting specific limits to the Ftmax, $\Delta$Tms and RFt values. By further limiting those physical characteristic values to the respective more preferred ranges, it is possible to increase the $\bar{I}z_0$ value to a level not less than 0 kg·cm/cm, more preferably not less than 100 kg·cm/cm, and the $\bar{I}z_{-30}$ value to a level not less than 35 kg·cm/cm, more preferably not less than 45 kg·cm/cm. Such levels can hardly be imagined in the light of common sense in the prior art.

A more preferred embodiment of the sheet according to the invention can be attained by limiting the dimensional change in thickness as measured at 120° C. to a level of not more than 5% preferably not more than 3%. One of the important drawbacks encountered with the products of stretching or rolling by the conventional techniques is that the sheets or molded articles obtained therefrom have very poor stability of shape or dimension. When such stretched or rolled products are allowed to stand at room temperature for a prolonged period of time or exposed to high temperatures for a short period of time, they show a tendency toward restoration of the thickness before stretching or rolling. The dimensional change in sheet thickness at 120° C. can serve as a measure through which the phenomenon of restoration can be comprehended, and it can be said that the smaller the change in thickness is, the smaller the extent of restoration is. As taught by the present invention, a small value of Ft in combination with a large value of $\Delta$Tm generally results in a very small change in thickness, whereby the shape stability at room temperature and the dimensional stability at high temperatures are improved. Furthermore, a sheet, when meeting the requirements for said physical characteristics, has good formability but does not show any "hanging down" which is a serious problem encountered in the manufacture of large shaped articles from conventional polypropylene sheets by thermoforming, for example by vacuum forming or pressure forming. Unlike conventional stretched or rolled sheets, a sheet according to the invention shows good formability, namely it comes into close contact with the mold in forming.

The sheet according to the invention is further characterized in that the crystallinity of the polymer constituting the sheet is relatively higher than expected. For improving the strength and elasticity modulus of sheets and shaped articles therefrom, it is general in the practice to decrease the crystallinity of polymers to thereby increase the impact resistance. To the contrary, however, the sheet according to the invention, as long as the above-mentioned physical characteristics requirements are met, has a very high level of impact resistance in spite of its higher crystallinity than usual. Therefore, it is characteristic of the sheet according to the invention that the crystallinity is high, so that not only the impact resistance is increased but also the strength and elasticity modulus thereof are improved. Said crystallinity should generally be not less than 65% and in most cases not less than 70%. The sheet also has a crystallinity improved in most cases by 3% or 5% or more as compared with the crystallinity as measured after melting of said sheet by heating under the same conditions as used in the determination of the above-mentioned $\Delta$Tm followed by allowing to cool.

The sheet according to the invention characteristically has a much lower crystalline orientation in the direction of the c axis (direction of molecular chain) as compared with the conventional rolled sheets. Thus, the sheet according to the invention shows a degree of orientation comparable to or less than that of a sheet obtained by mere extrusion molding. When expressed in terms of fc value, the crystalline orientation should generally be not more than 0.4 and, in preferred embodiments, is not more than 0.3 in most cases.

The conventional oriented sheets, in notched izod impact strength testing, display cracks on the fracture surface thereof and said cracks generally have a width of 0.2 mm or more and a length of 3.5 mm or more. On the contrary, the sheets according to the invention do not produce such cracks in notched izod impact strength testing but show, under a SEM, a fine-structure composed of laminated plate-like layers, which are very thin as compared with the conventional oriented sheets, in the plane parallel to the sheet plane.

In infrared absorption spectrum (IR), the sheet according to the invention does not differ from the conventional unrolled, rolled or cold calendered sheets. This indicates that there are no fundamental differences in chemical structure therebetween.

In accordance with the invention, there is no need to add a particular additive or compounding ingredient for increasing the impact resistance. No modification in molecular structure of the polypropylene is required, either. Therefore, the mechanical strength, electric properties, water resistance, chemical resistance and other properties inherent in polypropylene are retained in the sheet according to the invention without any substantial changes. This is a further characteristic feature of the invention.

The term "sheet" as used herein means a sheet in the ordinary sense of the term. The sheet thus has a thickness of 100 $\mu$m to 10 mm. In the practice of the invention, a sheet having a thickness within the range of 200 $\mu$m to 8 mm is particularly preferred since such sheet can easily be provided with the above-specified physical characteristics.

An example of the method of producing the sheet according to the invention is described in the following:

Firstly, a starting sheet having a very low degree of orientation is produced from a propylene-based polymer having an MFR of not more than 5 using a sheeting apparatus comprising an extruder fitted with a T-die, a chilled roll and a take-off unit. For producing said extremely low oriented starting sheet, it is necessary that the ratio between the die lip aperture and the thickness of the starting sheet (generally called "draw ratio") should be within a very specific range, namely 1.5 to 2.0. For obtaining less oriented starting sheets, it is desirable that several to several scores of such starting sheets be placed one upon another and melted to give a flat raw material block.

Said starting sheet (or block) is a sheet obtained by mere extrusion molding and therefore the Ft and $\Delta$Tm values thereof are substantially equal to zero and the notched izod impact strength is also as low as several kg·cm/cm. When said sheet (or block) is heated to a temperature not lower than the softening point thereof, in particular at a temperature within a very narrow range in the neighborhood of the melting point, and then spread under pressure to a high spreading ratio (high thickness reduction) over a sufficiently long period of time, the desired sheet improved in physical properties and characteristics such as impact resistance can be obtained. If the temperature is excessively high, the physical values, in particular the Ft value, of the sheet cannot be increased sufficiently to the desired extent and therefore a sheet having high notched izod impact strength cannot be obtained, even when the time and other conditions are adequately selected. On the other hand, when the temperature is lower, the Ft value becomes too great or the $\Delta$Tm value becomes too small, so that the sheet obtained has poor impact resistance and poor dimensional stability, formability and shape stability. At a temperature below the temperature at which melting of polymer crystals begins as revealed by DSC analysis, namely under the so-called cold pressing conditions, it is very difficult to obtain the sheet according to the invention no matter what other conditions are employed. A preferred temperature lies in a very narrow range from several degrees (centigrade) below the melting point (Tm) of polypropylene to several degrees (centigrade) above said melting point.

The time is an important factor in producing the sheet according to the invention. In cases where the pressure-spreading is performed in a moment, as in the conventional rolling, a sheet having a favorable Ft value and showing a desirable melting point difference ($\Delta$Tms), like the one according to the invention, can hardly be obtained even when the temperature lies in the most preferred range, namely in the vicinity of the melting point. The sheet obtained in such cases is not only insufficient in impact strength but also poor in dimensional stability and formability. To obtain the sheet according to the invention, a substantial time period of not less than 1 minute, preferably not less than 2 minutes, is required. The longer the pressure-spreading time is, the easier the production of the sheet according to the invention is. In particular, to obtain a sheet having an Ftmax value of not more than 15 kg·minute/cm$^2$, a period of not less than 3 minutes is required. From the economical viewpoint or from the viewpoint of sheet degradation, a certain range should naturally be selected. From this standpoint, a preferred time period is 2 to 60 minutes, more preferably 3 to 30 minutes.

The thickness reduction, which is defined by the sheet thickness before spreading and the sheet thickness after spreading, is also an important factor. Without applying pressure, the desired sheet cannot be obtained however long the starting sheet is allowed to stand in the vicinity of the melting point. In this respect, there is a lower limit to the thickness reduction. On the other hand, thoughtlessly increasing the thickness reduction will result in an increased Ft value and accordingly in decrease in izod strength, dimensional stability and formability. Since sheet spreading causes molecular chain elongation, the thickness reduction should be minimized as far as the object can be achieved. From these viewpoints, the thickness reduction is selected so as to be generally within the range of 2 to 15 times, preferably 3 to 10 times, whereby the desired sheet can be obtained.

As the apparatus for producing such sheet as mentioned above, there is preferred a flat press such as a hydraulic press or a mechanical press. Although a rolling press is the most popular equipment in the art of producing pressure-spread sheets, it is not the best equipment in the practice of the invention because of difficulty in temperature control and in obtaining a sufficient time period for sheet spreading.

When the sheet according to the invention is exposed to a temperature higher than the melting point thereof for a long period, the fine structure thereof is destroyed, whereby the physical properties such as impact resistance are unavoidably deteriorated.

The sheet according to the invention can be modified by any of the known methods unless the physical properties attained in accordance with the invention are adversely affected. For instance, some other resin may be blended with the propylene-based polymer, or there may be added a filler, colorant, pigment, flame retardant, heat stabilizer, degradation inhibitor, antioxidant, clarifier, antistatic agent, lubricant, fluorescent agent, antimicrobial agent and so forth, in small amounts, say less than about 10% by weight in total.

The sheet according to the invention can be subjected to any of the known forming processes and therefore can be used in the same fields of application as those known for the prior art polypropylene sheets. It is particularly recommended, however, that the sheet according to the invention should be used in those fields in which its low-temperature impact resistance may contribute, for example in the production of helmets, containers, pallets, trays, automobile parts, parts of other transporters, parts of electric devices and appliances, and building materials.

The following examples and comparative examples illustrate the invention in further detail. Other test methods and physical properties than those already mentioned or defined herein are as follows:

Tensile strength: The method prescribed in ASTM D 638 is used.

Flexural strength: The method prescribed in ASTM D 790 is used.

Penetration resistance: The method prescribed in JIS T 8131 is used. Among those sheets which failed to meet the requirement, those completely penetrated by the weight are indicated by "breakage".

Formability: Pressure forming is performed and the formability is evaluated in three respects, namely hanging down upon heating of the sheet, closeness in contact with the mold, and unevenness in thickness of the formed article.

Thickness reduction ratio = initial thickness (before pressure-spreading)/final thickness (after pressure-spreading).

EXAMPLES 1-8 AND COMPARATIVE EXAMPLES 1-6

A propylene homopolymer having a melt flow rate (MFR) of 1 was processed on a sheet-forming apparatus comprising a single-screw extruder (40 mm in screw diameter), a T-die with the lip distance adjusted to 3.7 mm and a sheet taking-off unit with a cooling roll adjusted to about 80° C., to give a raw sheet, 2 mm in thickness (draw ratio = 1.85) and 180 mm in width. Said raw sheet was cut to a length of 180 mm. Two to thirteen pieces are placed one upon another and pressed using a hydraulic press to give a raw block having a thickness of 3 to 30 mm. The pressing pressure was 25 kg/cm$^2$ and the actual temperature of the laminate was 185° C.

Said block was spread under pressure under the conditions given in Table 1 using a Shindo model YS-5 bench type test press (Shindo Kinzoku Kogyo's flat press) and then cooled under pressure on a water-cooled cooling press for 5 minutes to give a sheet. As the results shown in Table 1 indicate, each sheet according to the invention met the requirements relative to Ftmax, RFt and ΔTms. In each example, a sheet having markedly improved low-temperature impact resistance and average notched izod impact strength at room temperature was obtained. Said sheet showed no reduction but rather an increase in other strength parameters or flexural modulus. In particular, the sheet showed good formability in pressure forming, unlike the conventional polypropylene sheets which are defective in this respect.

The untreated raw sheet (sheet of Comparative Example 1; the same as a conventional extrusion-molded sheet) and the sheet obtained under extremely high temperature conditions (Comparative Example 2) showed Ftmax and ΔTms values each substantially equal to zero, were poor in impact resistance and penetrating resistance, and showed hanging down in forming shaped articles.

As compared with Comparative Example 2, the sheet of Comparative Example 3 for which the pressure-spreading temperature was 170° C. met the requirement relative to ΔTms but the Ftmax value was still small. Said sheet had somewhat increased but still unsatisfactory impact strength and showed poor formability.

In Comparative Example 4 where the pressure-spreading temperature was 158° C., the impact strength was improved but only to a slight extent due to the small ΔTms attained. Moreover, the sheet in said example showed poor formability because of the high dimensional change achieved.

In Comparative Example 5 where the thickness reduction was high and in Comparative Example 6 showing an example of the so-called cold-pressed sheet spread at 120° C., the Ftmax and dimensional change were both great and the formability was poor. The impact resistance was also poor.

Figure 2:
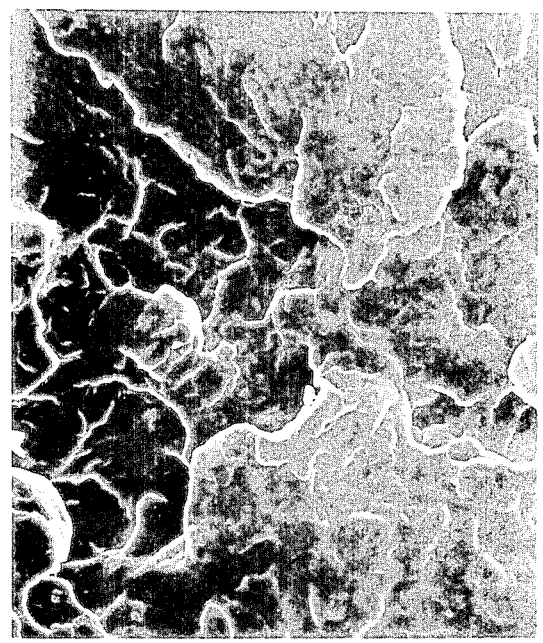
Figure 3:
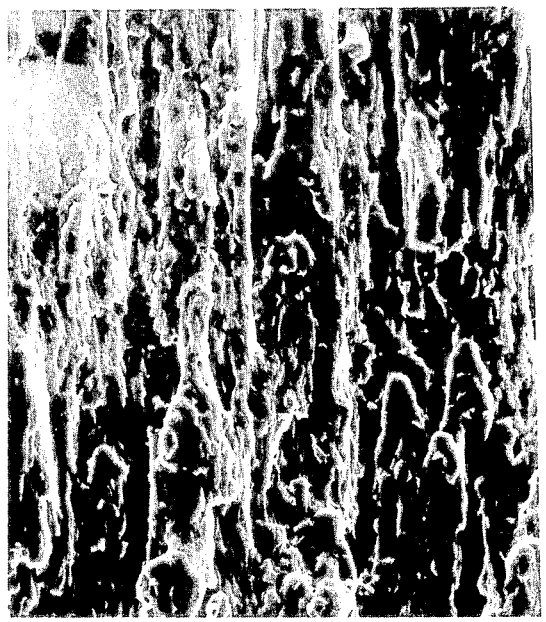

With the raw sheet obtained in Comparative Example 1, no plate-like layers were observed at all on the fracture surface thereof after notched izod impact strength testing, under a SEM, as can be seen in FIG. 2 (magnification 300 times). With the conventional oriented sheet of Comparative Example 6, plate-like layers were observed (FIG. 3), but each layer had a large thickness. On the contrary, a fine-structure composed of laminated, very thin plate-like layers was observed with the sheet according to the invention (FIG. 1).

COMPARATIVE EXAMPLES 7 AND 8

The same raw block as used in Example 1 was rolled on a Daito Seisakusho model DBR-50 small-sized roller unit, which was used in place of the flat press in Example 1, in 10 passes (effective contact period with roll being within 10 seconds), with the rolling temperature varied, followed by cooling on a cooling press. The physical characteristics of the 2 mm thick sheets thus obtained are shown in Table 1. The sheet of Comparative Example 8 showed marked anisotropy and showed poor impact strength and formability.

EXAMPLE 9 AND COMPARATIVE EXAMPLE 9

Using propylene-based polymers showing different MFR values in lieu of the propylene homopolymer with MFR=1, sheets were produced by the procedure of Example 1. The conditions employed for sheet production and the results obtained are shown in Table 2.

EXAMPLES 10 AND 11

Strips of the raw sheet as used in Example 1 were placed one upon another and directly (without heat melting for block formation) spread under pressure by the procedure of Example 1 to give sheets. The results obtained are shown in Table 2.

COMPARATIVE EXAMPLE 10 AND 11

Pressure-spread sheets were produced in the same manner as in Example 4 except that the raw sheet was processed at different draw ratios by adjusting the T-die lip distance. The results obtained are shown in Table 2. Both the sheets showed great anisotropy and failed to meet the requirements relative to impact resistance and formability.

EXAMPLES 12–15 AND COMPARATIVE EXAMPLES 12 AND 13

Sheets were produced by the procedure of Example 1 except that an ethylene-propylene block copolymer (ethylene content: 15% by weight) was used in lieu of the propylene homopolymer. The results obtained are shown in Table 3.

EXAMPLE 16

A sheet was produced in the same manner as Example 10 except that an ethylene-propylene block copolymer (ethylene content: 15% by weight) was used in place of the propylene homopolymer. The results obtained are shown in Table 3.

TABLE 1

| | Sheet production conditions | | | Characteristics and physical properties of sheet | | | | | |
|---|---|---|---|---|---|---|---|---|---|
| No. | Temperature (°C.) | Time (min.) | Thickness reduction (times) | Thickness (mm) | Ftmax (kg·min/cm²) | RFt | ΔTms (°C.) | Crystallinity (%) | fc | Dimensional change in thickness (%) |
| Ex. 1 | 165 | 7 | 6 | 2 | 5.2 | 1.2 | 9 | 70 | <0.01 | 0.8 |
| Ex. 2 | 165 | 15 | 6 | 2 | 1.0 | 1.6 | 10 | 74 | <0.01 | 0.5 |
| Ex. 3 | 165 | 30 | 6 | 2 | 1.1 | 1.2 | 8 | 75 | <0.01 | 0.2 |
| Ex. 4 | 165 | 10 | 6 | 4 | 5.7 | 1.2 | 8 | 70 | <0.01 | 0.9 |
| Ex. 5 | 165 | 2 | 6 | 0.5 | 2.1 | 1.1 | 8 | 69 | <0.01 | 0.2 |
| Ex. 6 | 163 | 5 | 6 | 2 | 5.3 | 1.9 | 7 | 70 | <0.01 | 1.8 |
| Ex. 7 | 160 | 2 | 6 | 2 | 5.0 | 1.1 | 4 | 67 | <0.01 | 3.5 |
| Ex. 8 | 162 | 3 | 15 | 2 | 28 | 1.2 | 8 | 72 | <0.01 | 2.8 |
| Com. | | | | | | | | | | |
| Ex. 1 | — | — | — | 2 | 0.3 | 3.0 | 0 | 61 | 0.20 | 0.0 |
| Ex. 2 | 190 | 5 | 6 | 2 | 0.1 | — | 0 | 62 | 0.08 | 0.3 |
| Ex. 3 | 170 | 15 | 6 | 2 | 0.3 | 1.1 | 10 | 76 | <0.01 | 0.5 |
| Ex. 4 | 158 | 7 | 6 | 2 | 12 | 1.4 | 2 | 68 | <0.01 | 16 |
| Ex. 5 | 160 | 5 | 18 | 2 | 55 | 2.1 | 8 | 72 | <0.01 | 7 |
| Ex. 6 | 120 | 5 | 12 | 2 | 48 | 1.3 | 0 | 60 | 0.29 | 110 |
| Ex. 7 | 165 | — | 6 | 2 | (Adhesion of sheet to roll and failure in giving good sheet.) | | | | | |
| Ex. 8 | 150 | — | 4 | 2 | 50 | 15 | 0.4 | 62 | 0.65 | 21 |

| | Characteristics and physical properties of sheet | | | | | | | |
|---|---|---|---|---|---|---|---|---|
| | Izod impact strength (kg·cm/cm) | | | | Tensile strength (kg/cm²) | Flexural strength (kg/cm²) | Elasticity modulus (kg/cm²) | Penetration resistance | Formability |
| No. | 20° C. | 0° C. | −30° C. | RIzo | | | | | |
| Ex. 1 | 158 | 125 | 57 | 1.05 | 410 | 480 | 1.9×10⁴ | Adequate | Good |
| Ex. 2 | 140 | 110 | 45 | 1.2 | 420 | 510 | 2.0 | " | " |
| Ex. 3 | 160 | 150 | 79 | 1.2 | 400 | 470 | 1.9 | " | " |
| Ex. 4 | 160 | 125 | 55 | 1.1 | 430 | 490 | 1.9 | — | " |
| Ex. 5 | 140 | 110 | 47 | 1.1 | 475 | — | — | — | " |
| Ex. 6 | 135 | 105 | 40 | 1.2 | 430 | 510 | 2.1 | Adequate | " |
| Ex. 7 | 100 | 80 | 34 | 1.0 | 420 | 480 | 1.8 | " | " |
| Ex. 8 | 90 | 70 | 32 | 1.1 | 450 | 500 | 1.8 | " | " |
| Com. | | | | | | | | | |
| Ex. 1 | 4.0 | 3.2 | 1.5 | 1.8 | 310 | 410 | 1.2 | Breakage | Hanging down |
| Ex. 2 | 3.8 | 2.0 | 1.5 | 1.0 | — | — | — | " | " |
| Ex. 3 | 73 | 20 | 10 | 1.05 | — | — | — | Inadequate | " |
| Ex. 4 | 76 | 45 | 28 | 1.2 | — | — | — | Adequate | Poor contact with mold |
| Ex. 5 | 81 | 42 | 22 | 1.2 | — | — | — | Inadequate | Poor contact with mold |
| Ex. 6 | 70 | 30 | 16 | 1.1 | 430 | 490 | 1.8 | " | Not formable due to breakage |
| Ex. 7 | (Adhesion of sheet to roll and failure in giving good sheet.) | | | | | | | | |
| Ex. 8 | — | 35 | 20 | 22 | — | — | — | Breakage | Not formable due to breakage |

TABLE 2

| No. | MFR of polymer (g/10 min.) | Draw ratio | Time (min.) | Thickness reduction (times) | Ftmax (kg·min/cm²) | RFt | ΔTms (°C.) | Crystallinity (%) | fc |
|---|---|---|---|---|---|---|---|---|---|
| Ex. 9 | 4 | 1.85 | 7 | 6 | 3.2 | 1.2 | 7 | 72 | <0.01 |
| Ex. 10 | 1 | 1.85 | 7 | 6 | 25 | 7.5 | 8 | 72 | 0.24 |
| Ex. 11 | 1 | 1.85 | 3 | 15 | 40 | 8.0 | 9 | 73 | 0.35 |
| Com. | | | | | | | | | |
| Ex. 9 | 10 | 1.85 | 7 | 6 | 6 | 1.1 | 9 | 76 | <0.01 |
| Ex. 10 | 1 | 3 | 10 | 6 | 32 | 12 | 9 | 75 | 0.35 |
| Ex. 11 | 1 | 1 | 10 | 6 | 29 | 11 | 9 | 73 | 0.29 |

| No. | MFR of polymer (g/10 min.) | Dimensional change in thickness (%) | Izod impact strength (kg·cm/cm) 0° C. | Izod impact strength (kg·cm/cm) −30° C. | RIzo | Penetration resistance | Formability |
|---|---|---|---|---|---|---|---|
| Ex. 9 | 4 | 0.9 | 70 | 35 | 1.2 | Adequate | Good |
| Ex. 10 | 1 | 2.0 | 70 | 40 | 2.5 | " | " |
| Ex. 11 | 1 | 3.6 | 60 | 31 | 2.6 | " | " |
| Com. | | | | | | | |
| Ex. 9 | 10 | 2.5 | 7 | 1.5 | 1.3 | Breakage | Good |
| Ex. 10 | 1 | 2.5 | 65 | 27 | 34 | " | Poor contact with mold |
| Ex. 11 | 1 | 1.9 | 62 | 28 | 29 | " | Poor contact with mold |

TABLE 3

| No. | MFR of Polymer (g/10 min.) | Temperature (°C.) | Time (min.) | Thickness reduction (times) | Thickness (mm) | Ftmax (kg·min/cm²) | RFt | ΔTms (°C.) | Crystallinity (%) |
|---|---|---|---|---|---|---|---|---|---|
| Ex. 12 | 0.5 | 164 | 2 | 6 | 0.3 | 6.5 | 1.2 | 9 | 74 |
| Ex. 13 | 0.5 | 164 | 10 | 6 | 6 | 4.8 | 1.2 | 9 | 73 |
| Ex. 14 | 0.5 | 161 | 3 | 10 | 2 | 29 | 4.2 | 9 | 72 |
| Ex. 15 | 2.0 | 164 | 7 | 6 | 3 | 4.8 | 1.1 | 8 | 72 |
| Ex. 16 | 0.5 | 164 | 7 | 6 | 2 | 27 | 5.0 | 10 | 73 |
| Com. | | | | | | | | | |
| Ex. 11 | 0.5 | 140 | 3 | 6 | 2 | 8 | 1.2 | 1.5 | 62 |
| Ex. 12 | 10 | 162 | 7 | 6 | 2 | 7 | 1.05 | 10 | 74 |

| No. | MFR of Polymer (g/10 min.) | fc | Dimensional change in thickness (%) | Izod impact strength (kg·cm/cm) 0° C. | Izod impact strength (kg·cm/cm) −30° C. | RIzo | Penetration resistance | Formability |
|---|---|---|---|---|---|---|---|---|
| Ex. 12 | 0.5 | <0.01 | 2 | 120 | 115 | 1.2 | — | Good |
| Ex. 13 | 0.5 | <0.01 | 1.1 | 130 | 120 | 1.2 | Adequate | " |
| Ex. 14 | 0.5 | <0.01 | 2.0 | 55 | 40 | 1.0 | " | " |
| Ex. 15 | 2.0 | <0.01 | 1.1 | 105 | 102 | 1.1 | " | " |
| Ex. 16 | 0.5 | 0.30 | 1.8 | 115 | 105 | 2.5 | " | " |
| Com. | | | | | | | | |
| Ex. 11 | 0.5 | <0.01 | 80 | 48 | 29 | 1.1 | Adequate | Poor contact with mold |
| Ex. 12 | 10 | <0.01 | 0.5 | 6 | 3 | 1.4 | Breakage | Good |

FORMING EXAMPLE

Helmets, 3 mm in thickness, were produced from the sheet obtained in Example 1 or the raw sheet of Comparative Example 1 using a pressure forming device equipped with a far infrared heater. Each helmet weighed 260 g.

Separately, a composition composed of 80 weight parts of an unsaturated polyester resin (Polylite ® 8010, Dainippon Ink and Chemicals), 29 weight parts of glass fiber (chopped strands) and 1 weight part of a polymerization catalyst (benzoyl peroxide) was molded into 3 mm thick helmets by the matched die method. The helmet weight was 420 g.

These helmets were subjected to the ballistic tests (I and II) according to the methods prescribed in JIS T 8133-1978.

The helmet produced from the sheet material obtained in Example 1 passed the penetration resistance tests, whereas the helmets produced from the raw sheet of Comparative Example 1 each failed to pass the tests. The helmets from the unsaturated polyester resin passed the test I but failed to pass the test II.

What is claimed is:

1. A polypropylene sheet having a thickness of at least 200 μm characterized in (a) that the base material is a propylene-based polymer having a melt flow rate of not more than 5 and a propylene unit content of not less than 70% by weight, (b) that the maximum value (Ftmax) among the values (Ft's) of integration of the force parallel to the sheet plane, as appearing upon heating said sheet at a temperature above the melting point thereof over the time period during which said force is observed, falls within the range of 0.5–45 kg.minute/cm², (c) that the ratio (RFt) between Ft's measured in directions at right angles to each other on the sheet plane is not more than 10, and (d) that the melting point (Tms) of said sheet is higher than the melting point (Tmr) of said sheet as measured after melting followed by recrystallization in the unstrained condition, the melting point difference ($\Delta Tms = Tms - Tmr$) being at least 3° C.

2. The sheet of claim 1, wherein the propylene-based polymer constituting said sheet has a crystallinity of at least 65% and wherein the orientation function (fc) is not more than 0.4.

3. The sheet of claim 2, wherein the average notched izod impact strength of said sheet at 0° C. is at least 50 kg.cm/cm.

4. The sheet of claim 3, wherein the average notched izod impact strength of said sheet at $-30°$ C. is at least 30 kg.cm/cm.

5. The sheet of claim 4, wherein the dimensional change in sheet thickness as measured at 120° C. is not more than 5%.

6. The sheet of claim 5, wherein the ratio (RIzo) between notched izod impact strength values measured at 0° C. in directions at right angles to each other on the sheet plane is not more than 3.

7. The sheet of claim 1, wherein the maximum value (Ftmax) among the values (Ft's) of integration of the force parallel to the sheet plane as appearing upon heating said sheet at a temperature above the melting point thereof over the time period during which said force is observed falls within the range of 1–20 kg.minute/cm$^2$.

8. A polypropylene sheet having a thickness of at least 200 μm characterized in that the base material is a propylene-based polymer having a melt flow rate of not more than 5 and a propylene unit content of not less than 70% by weight, that the average notched Izod impact strength of said sheet at 0° C. is at least 50 kg.cm/cm, and that the average notched Izod impact strength at $-30°$ C. is at least 30 kg.cm/cm.

9. The sheet of claim 8, wherein the propylene-based polymer constituting said sheet has a crystallinity of at least 65% and wherein the orientation function (fc) is not more than 0.4.

10. The sheet of claim 8, wherein the ratio (RIzo) between notched izod impact strength values measured at 0° C. in directions at right angles to each other on the sheet plane is not more than 3.

11. The sheet of claim 10, wherein the percentage increase in sheet thickness as found upon heating said sheet to 120° C. is not more than 5%.

12. The sheet of claim 11, wherein the maximum value (Ftmax) among the values (Ft's) of integration of the force parallel to the sheet plane as appearing upon heating said sheet at a temperature above the melting point thereof over the time period during which said force is observed falls within the range of 0.5–45 kg.minute/cm$^2$ and wherein the ratio (RFt) between Ft's measured in directions at right angles to each other on the sheet plane is not more than 10.

13. The sheet of claim 12, wherein the maximum value (Ftmax) among the values (Ft's) of integration of the force parallel to the sheet plane as appearing upon heating said sheet at a temperature above the melting point thereof over the time period during which said force is observed falls within the range of 1–20 kg.minute/cm$^2$.

14. A polypropylene sheet having a thickness of at least 200 μm having a base material which is a propylene-based polymer having a melt flow rate of not less than 5 and a propylene unit content of not less than 70% by weight, characterized in that said sheet is a product of pressure-spreading of said polymer in the vicinity of the melting point thereof, that the average notched Izod impact strength of said sheet at 0° C. is at least 50 kg.cm/cm, and that the average notched Izod impact strength at $-30°$ C. is at least 30 kg.cm/cm.

15. The sheet of claim 14, wherein the propylene-based polymer constituting said sheet has a crystallinity of at least 65% and wherein the orientation function (fc) is not more than 0.4.

16. The sheet of claim 15, wherein the ratio (RIzo) between notched izod impact strength values measured at 0° C. in directions at right angles to each other on the sheet plane is not more than 3.

17. The sheet of claim 16, wherein the dimensional change in sheet thickness as measured at 120° C. is not more than 5%.

18. The sheet of claim 17, wherein the maximum value (Ft's) of integration of the force parallel to the sheet plane as appearing upon heating said sheet at a temperature above the melting point thereof over the time period during which said force is observed falls within the range of 0.5–45 kg.minute/cm$^2$ and wherein the ratio (RFt) between Rt's measured in directions at right angles to each other on the sheet plane is not more than 10.

19. The sheet of claim 19, wherein the maximum value (Ftmax) among the values (Ft's) of integration of the force parallel to the sheet plane as appearing upon heating said sheet at a temperature above the melting point thereof over the time period during which said force is observed is within the range of 1–20 kg.minute/cm$^2$.

* * * * *